(12) United States Patent
Simoneau

(10) Patent No.: US 11,554,478 B1
(45) Date of Patent: Jan. 17, 2023

(54) MOBILE TOOLBOX APPARATUS

(71) Applicant: Michael Simoneau, Jacksonville, FL (US)

(72) Inventor: Michael Simoneau, Jacksonville, FL (US)

( * ) Notice: Subject to any disclaimer, the term of this patent is extended or adjusted under 35 U.S.C. 154(b) by 293 days.

(21) Appl. No.: 16/221,724

(22) Filed: Dec. 17, 2018

(51) Int. Cl.
B25H 1/00 (2006.01)
B25H 3/02 (2006.01)
B25H 1/12 (2006.01)
B25H 1/04 (2006.01)
B62B 3/02 (2006.01)
B25H 3/00 (2006.01)

(52) U.S. Cl.
CPC ............ B25H 3/021 (2013.01); B25H 1/0035 (2013.01); B25H 1/04 (2013.01); B25H 1/12 (2013.01); *B25H 3/003* (2013.01); *B62B 3/02* (2013.01)

(58) Field of Classification Search
CPC ........ B25H 3/021; B25H 1/0035; B25H 1/04; B25H 1/12
See application file for complete search history.

(56) References Cited

U.S. PATENT DOCUMENTS

| | | | | |
|---|---|---|---|---|
| 1,688,533 A * | 10/1928 | Eger | ................ | B25H 1/04 144/285 |
| 2,733,113 A * | 1/1956 | Humbargar | .......... | A47B 81/007 312/249.7 |
| 2,750,243 A * | 6/1956 | Zielfeldt | ............... | A47B 3/0803 108/78 |
| 4,066,023 A * | 1/1978 | Hughes | ................ | G03B 27/625 108/50.01 |
| 4,392,437 A * | 7/1983 | Wallace | .................... | A47B 3/00 108/129 |
| 5,224,531 A * | 7/1993 | Blohm | ....................... | B25H 3/00 108/110 |
| 5,878,882 A | 3/1999 | Kohagura | | |
| 5,893,572 A * | 4/1999 | Parks | ....................... | B25H 1/04 280/47.18 |
| 5,927,837 A * | 7/1999 | Schmidt | ................... | B25H 1/12 206/373 |
| 7,306,245 B1 * | 12/2007 | Lowe | ....................... | B25H 3/02 280/47.18 |
| 7,434,819 B1 * | 10/2008 | Dunavin | .................. | B25H 3/02 144/285 |
| 7,464,978 B1 * | 12/2008 | Meeks | ...................... | B25H 1/00 108/44 |
| 7,503,569 B2 * | 3/2009 | Duvigneau | .......... | A45C 7/0045 190/110 |
| 7,510,078 B2 | 3/2009 | Schmidt et al. | | |
| 7,815,215 B1 * | 10/2010 | Lowe | ...................... | B25H 1/04 280/47.18 |

(Continued)

*Primary Examiner* — Brian L Swenson
(74) *Attorney, Agent, or Firm* — Sanchelima & Associates, P.A.; Christian Sanchelima; Jesus Sanchelima

(57) ABSTRACT

A toolbox apparatus having mobility is disclosed. The mobile toolbox apparatus comprises a toolbox, a platform on which the toolbox is mounted, supporting means provided on the operative bottom surface of the platform, and at least one wheel coupled to at least one supporting means for providing mobility to the mobile toolbox apparatus. The apparatus comprises a handle coupled to the platform, wherein the handle has a telescopic configuration. The apparatus further comprises a platform extension hingeably coupled to the platform.

9 Claims, 4 Drawing Sheets

(56) References Cited

U.S. PATENT DOCUMENTS

| | | | | |
|---|---|---|---|---|
| 8,915,504 B1* | 12/2014 | Seibert | ............... | B62B 1/10 |
| | | | | 280/47.16 |
| 9,415,503 B1* | 8/2016 | Ferragonio | ............ | B25H 1/04 |
| 2002/0164240 A1* | 11/2002 | Fritter | ............... | B62B 3/04 |
| | | | | 414/498 |
| 2002/0179181 A1* | 12/2002 | Murphy | ............... | B25H 1/04 |
| | | | | 144/286.5 |
| 2005/0150724 A1* | 7/2005 | Snider | ............... | B25H 1/04 |
| | | | | 182/129 |
| 2006/0006628 A1* | 1/2006 | Fields | ............... | B25H 1/04 |
| | | | | 280/640 |
| 2008/0245441 A1* | 10/2008 | Blum | ............... | B25H 1/04 |
| | | | | 144/286.5 |
| 2011/0232805 A1* | 9/2011 | DeSpain | ............ | B25H 1/04 |
| | | | | 144/285 |
| 2013/0118818 A1* | 5/2013 | Smith | ............... | B25H 1/04 |
| | | | | 180/19.1 |
| 2013/0285302 A1* | 10/2013 | Helm | ............... | B25H 1/14 |
| | | | | 269/17 |
| 2013/0307238 A1* | 11/2013 | Campbell | ............ | B62B 1/002 |
| | | | | 280/35 |
| 2016/0058171 A1* | 3/2016 | Moyer | ............... | B23Q 3/18 |
| | | | | 312/281 |
| 2016/0332292 A1* | 11/2016 | Cheff | ............... | B25H 1/04 |
| 2018/0290288 A1* | 10/2018 | Brunner | ............ | B25H 1/04 |

* cited by examiner

MOBILE TOOLBOX APPARATUS

BACKGROUND OF THE INVENTION

1. Field of the Invention

The present disclosure relates to a toolbox. In particular, the present disclosure relates to a toolbox that is mobile and is easy to maneuver.

2. Description of the Related Art

A toolbox is a container for housing different kinds of tools. When the toolbox is storing the tools, it tends to get heavy, which makes it difficult to be carried by a human operator. Therefore, there is felt a need of a toolbox that possesses mobility for reducing the effort associated with carrying the toolbox.

Several designs for toolboxes have been designed in the past. None of them, however, are known to be mobile and requires significantly less effort to be carried as compared to the conventional toolboxes.

Applicant believes that a related reference corresponds to U.S. Pat. No. 5,878,882 filed by RONALD S. KOHAGURA. The Kohagura reference discloses a toolbox having a drawer like component for storing different tools. However, the Kohagura reference fails to disclose any means that provide mobility to the toolbox with minimum effort required to move the toolbox around.

Another related application is U.S. Pat. No. 7,510,078 filed by LAVERN D. SCHMIDT and VINCENT G. KOEHN. The Schmidt reference discloses a toolbox having a container portion and a cover rotatably mounted on the toolbox, wherein the cover has a horizontal section and a slanted section sloping downwardly from the horizontal section. However, the Schmidt reference fails to disclose any means that provide mobility to the toolbox with minimum effort required to move the toolbox around.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a mobile toolbox apparatus that reduces the effort associated with moving the toolbox.

It is yet another object of the present invention to provide a mobile toolbox apparatus that eliminates the need of having the human operator bend down to fetch the tools of his need.

It is yet another object of the present invention to provide a mobile toolbox apparatus that allows the human operator to locate the required tools with relative ease.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
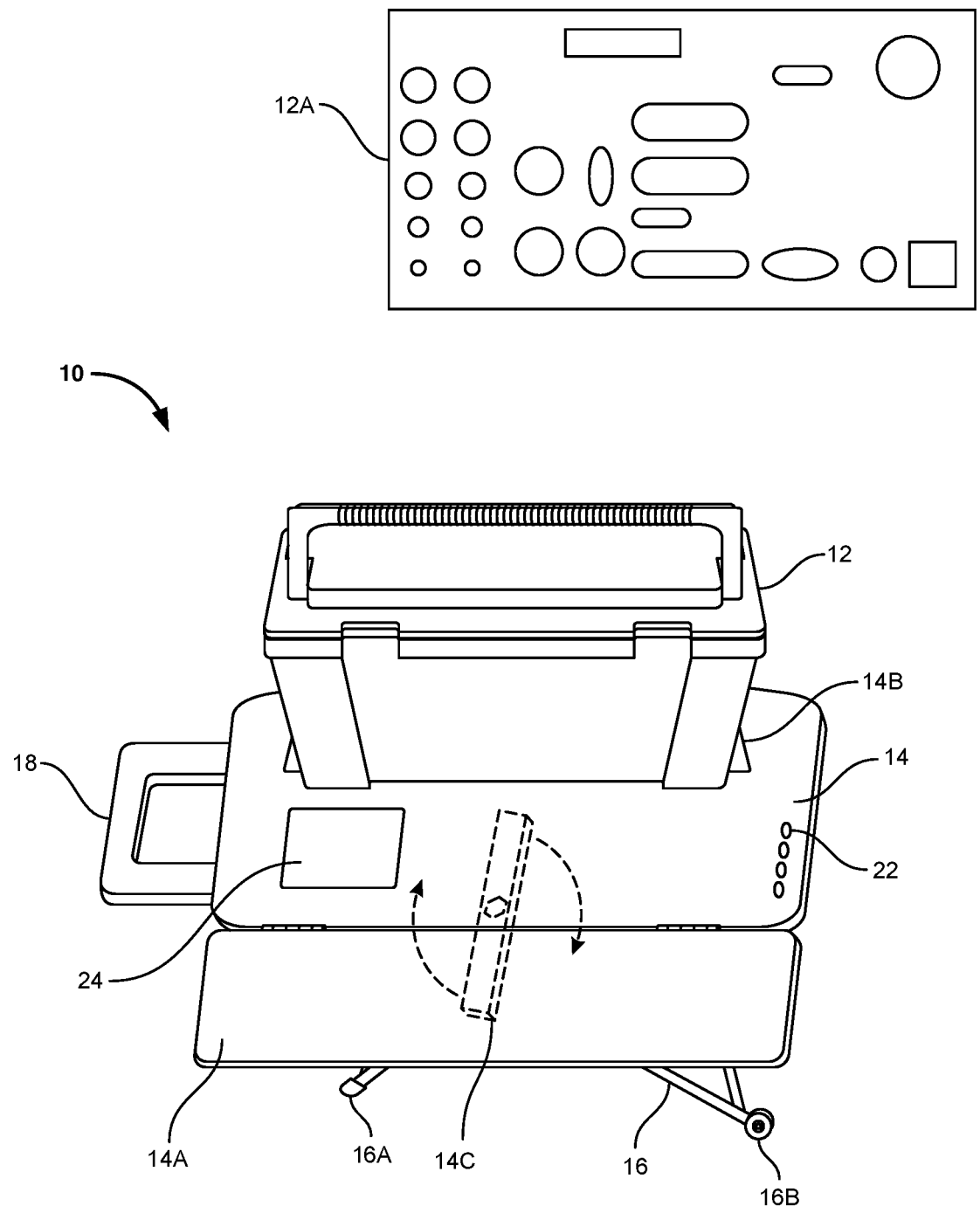
FIG. 1 represents an isometric view of the present invention showing a mobile toolbox apparatus 10 comprising toolbox 12, a platform 14 having a hingeable platform extension 14A, on which the toolbox 12 is placed, and wheels 18 mounted on supporting means.
Figure 2:
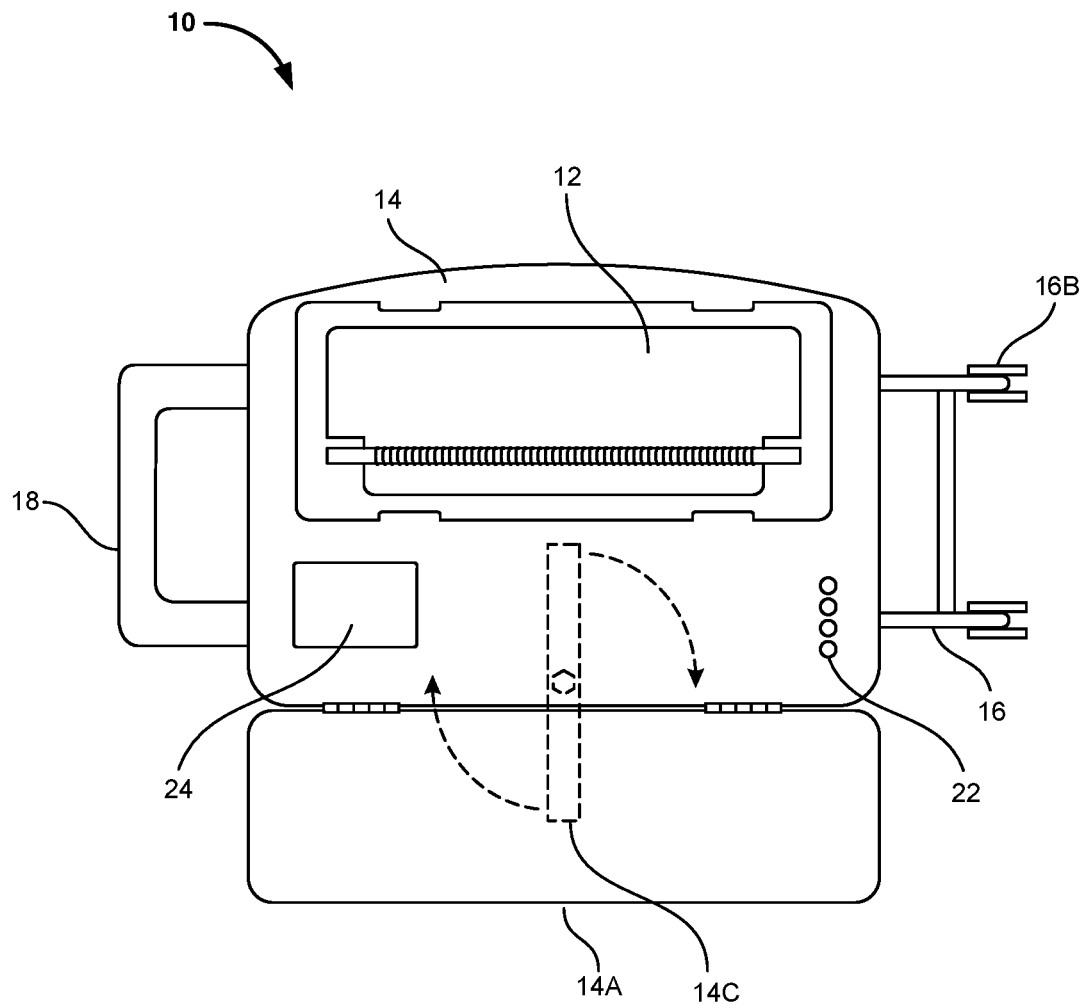
FIG. 2 represents a top view of the present invention showing a mobile toolbox apparatus 10, wherein the extension 14A is in its unfolded configuration, in accordance with an embodiment of the present invention.
Figure 3:
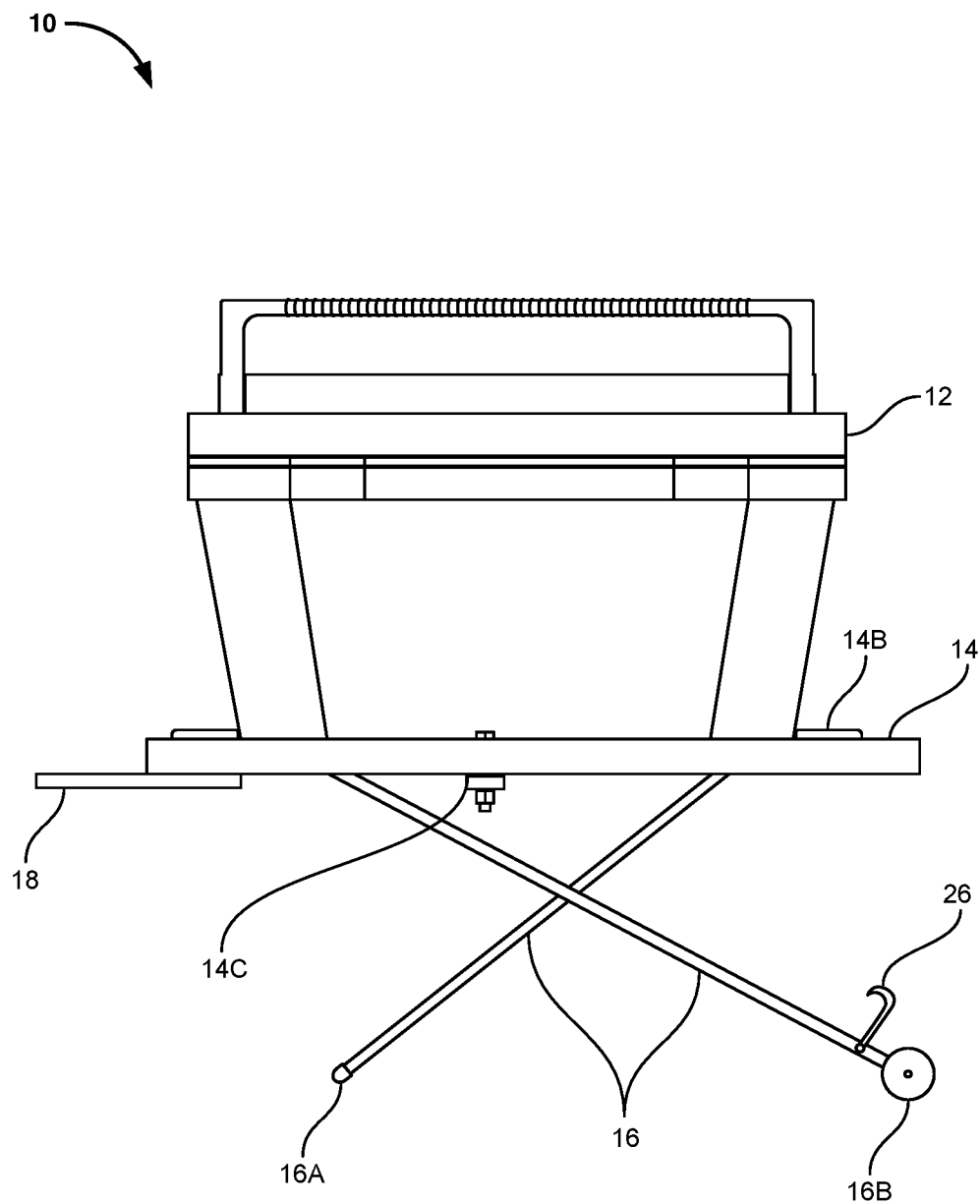
FIG. 3 illustrates a side view of the mobile toolbox apparatus 10, in which the supporting means 16 are in an unfolded configuration.

Referring now to the drawings, FIGS. 1-3, where the present invention is generally referred to with numeral 10, it can be observed that a mobile toolbox apparatus 10 (hereinafter also referred to as apparatus 10) comprises a toolbox 12. The toolbox 12 can be any conventional toolbox. In one embodiment, the toolbox 12 has preset inserts provided therewithin which have a pre-defined configuration to accommodate pre-defined tools, thereby allowing a user to easily locate those tools as required. One such tool insert 12A is seen in FIG. 1. The apparatus 10 further comprises a platform 14, supporting means 16, and wheels 18.

The toolbox 12 is mounted on the platform 14. In one embodiment, the toolbox 12 is secured onto the platform via clip mechanism 14B configured on the platform 14. In one embodiment, the toolbox 12 is also provided with complementary clip formations to engage with the clip mechanism 14B. The platform 14 further comprises a hingeable foldable extension 14A that is hingeably connected to the platform 14. To maintain the extension 14A in its unfolded operational configuration, a support member 14C is provided on the operative bottom surface of the platform 14. The support member 14C is configured for swiveling action, as denoted by the dotted arrows in FIGS. 1 and 2.

On the operative bottom surface of the platform 14 are provided the supporting means 16 that hold the platform 14 and the toolbox 12 stably above the ground. In one embodiment, the supporting means 16 are U shaped foldable legs. In a preferred embodiment, the supporting means 16 include two U shaped foldable legs. The two U shaped foldable legs provide a stable four-point contact with the floor to stably hold the platform 14 and the toolbox 12. One of the supporting means 16 comprises rubber dampers 16A, while the remnant supporting means 16 includes a pair of wheels 16B mounted thereto. The provision of the wheels on the channels 16B provides mobility to the apparatus 10.

In one embodiment, the apparatus 10 further comprises a handle 18 coupled to the platform 14. In one embodiment, the handle 18 is a telescopic handle 18, wherein the operational height of the handle 18 can be varied as per the application requirements.

Figure 4:
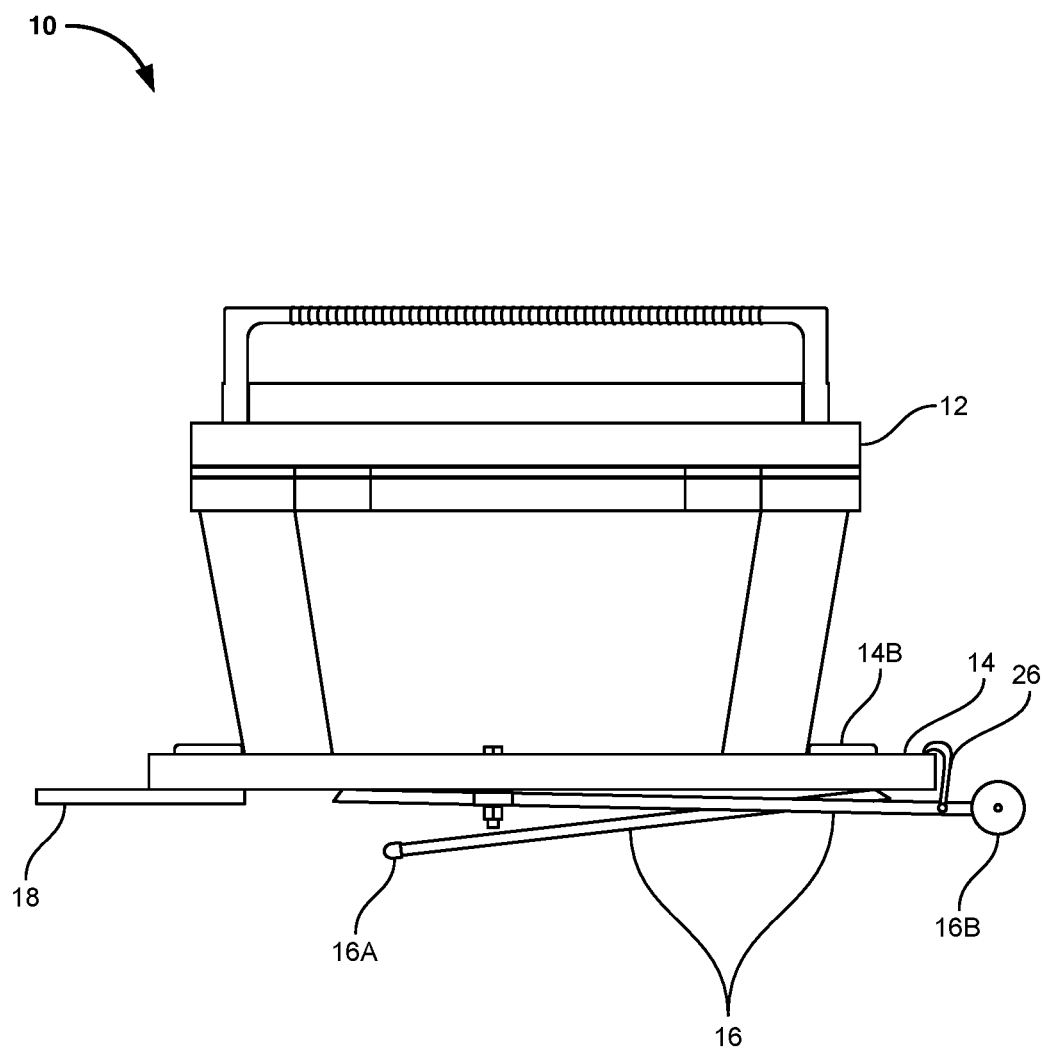
FIG. 4 illustrates another side view of the mobile toolbox apparatus 10, in which the supporting means 16 are in a folded configuration.

The provision of the handle 18 and the wheels 16B provide the apparatus 10 with a trolley like configuration which overcomes the need of having to lift the toolbox 12 for being carried. The apparatus 10 can be just pushed to wherever it is required using the support means 16 being used as a handle and the provision of the wheels 18. The toolbox 10 can further include hingeable latches 26 provided on the supporting means 16, as seen in FIGS. 3 and 4. As seen in FIG. 4, the latches 26 allow the supporting means to be latched onto the platform 14 in the folded configuration of the toolbox 10, thereby providing a relatively easy to handle trolley like configuration thereto.

The apparatus 10 further comprises a plurality of apertures 22 configured on the platform 14. The apertures 22 can have different shapes and sizes. More specifically, these apertures 22 are provided for allowing the user to place his tool therein in an inserted manner. For example, if the user is using a screw driver, and he needs to switch to another tool, the user can hang the screw driver in one of the apertures to get to another tool. The advantage of these apertures 22 is that the user does not have to place his tool on any delicate surface, thereby preventing scratch formations on that surface due to the placement of the tools thereon.

The apparatus 10 further comprises a magnetic portion 24 provided on the platform 14. The magnetic portion 24 can be a magnetic tray. The magnetic tray allows the user to place small screws, fasteners, and other small magnetic components which can be easily misplaced. The advantage of the magnetic portion 24 is that instead of holding the small screws in hand while working, the user can place the small screws on the magnetic portion 24 without having to worry about misplacing them at all.

The apparatus 10 also holds the toolbox 12 at an elevated position. As such, the user does not have to bend down repeatedly to swap tools. This reduces the fatigue otherwise associated with the usage of the conventional toolboxes.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A mobile toolbox apparatus comprising:
   a. a toolbox;
   b. a platform, said platform including a clip mechanism thereon, said toolbox being centrally mounted onto said platform, said toolbox secured atop of said clip mechanism, said clip mechanism having a clip length, said toolbox having a toolbox length, said clip length being greater than said toolbox length, said platform further including a plurality of apertures, said apertures being perpendicular to said toolbox, said platform further including a magnetic portion thereon, said magnetic portion being a magnetic tray, said magnetic portion being parallel to said plurality of apertures, said plurality of apertures extending partially along a width of said platform;
   c. at least one supporting means provided on the operative bottom surface of the platform, said at least one supporting means being a pair of foldable legs, said pair of foldable legs intersecting one another; and
   d. at least one wheel coupled to at least one supporting means for providing mobility to the mobile toolbox apparatus, said at least one wheel being entirely below said platform when said platform is horizontal and said at least one supporting means are expanded, said at least one wheel being entirely below said platform when said platform is vertical and said at least one supporting means are collapsed.

2. The apparatus of claim 1, wherein the pair of foldable legs have a U shaped configuration for providing a four-point contact with the floor to stably support the platform.

3. The apparatus of claim 2, further comprising at least one rubber damper provided on the free ends of the at least one supporting means.

4. The apparatus of claim 1, wherein the platform includes a platform extension that is hingeably connected to the platform, said platform extension being on only one peripheral side of said platform.

5. The apparatus of claim 4, further includes a support member disposed on an operative bottom surface of the platform and configured for swiveling motion, wherein the support member is configured to support the platform extension in an unfolded configuration thereof, said support member being partially underneath both of said platform and said platform extension when said platform extension is in the unfolded configuration.

6. The apparatus of claim 1, further includes latches, said latches being mounted onto said pair of folding legs, wherein the latches are configured to allow the pair of folding legs to be latched onto the platform in the folded configuration of the pair of folding legs, thereby providing a relatively easy to handle trolley like configuration thereto, said latches extending adjacent and entirely along a thickness of said platform when latched onto said platform, said latches being perpendicular to said pair of folding legs and extending vertically when latched onto said platform, said latches being partially above of said platform when latched onto said platform.

7. The apparatus of claim 1, wherein the toolbox comprises preset inserts for facilitating ease of locating the tools within the toolbox.

8. The apparatus of claim 1, wherein the toolbox has a shape selected from a group consisting of rectangle, square, circular, and polygonal.

9. The apparatus of claim 1, wherein at least one handle is mounted underneath of said platform, said at least one handle being partially under said platform, said at least one handle being telescopic, said at least one handle being parallel to said platform.

* * * * *